United States Patent
Takahashi et al.

(10) Patent No.: US 6,261,982 B1
(45) Date of Patent: Jul. 17, 2001

(54) CORDIERITE CERAMIC FILTER

(75) Inventors: Hideo Takahashi; Akira Mitsui, both of Kanagawa (JP)

(73) Assignee: Asahi Glass Company Ltd., Tokyo (JP)

( * ) Notice: Subject to any disclaimer, the term of this patent is extended or adjusted under 35 U.S.C. 154(b) by 0 days.

(21) Appl. No.: 09/437,443

(22) Filed: Nov. 10, 1999

(30) Foreign Application Priority Data

Nov. 12, 1998 (JP) .................................................. 10-321758

(51) Int. Cl.$^7$ ......................... C04B 35/195; C03C 10/08; B01D 46/24
(52) U.S. Cl. ............................... 501/118; 501/9; 501/119; 55/523
(58) Field of Search ............................. 501/7, 9, 80, 119, 501/118; 55/523

(56) References Cited

U.S. PATENT DOCUMENTS

| | | |
|---|---|---|
| 4,595,662 | 6/1986 | Mochida et al. . |
| 5,073,178 * | 12/1991 | Mimori et al. ........................ 55/523 |
| 5,198,006 * | 3/1993 | Mimori et al. ........................ 55/523 |
| 5,552,349 | 9/1996 | Ichii et al. . |
| 5,607,885 * | 3/1997 | Ichii et al. .............................. 501/9 |
| 5,914,294 * | 6/1999 | Park et al. ............................ 501/100 |

FOREIGN PATENT DOCUMENTS

| | | |
|---|---|---|
| 0 630 677 | 12/1994 | (EP) . |
| 0 658 363 | 6/1995 | (EP) . |
| 0 661 088 | 7/1995 | (EP) . |
| 3-68411 * | 3/1991 | (JP) . |
| 363031517 * | 2/1998 | (JP) . |

* cited by examiner

Primary Examiner—Karl Group
(74) Attorney, Agent, or Firm—Oblon, Spivak, McClelland, Maier & Neustadt, P.C.

(57) ABSTRACT

A ceramic filter comprising at least 50 mass % of a cordierite aggregate having a particle size of at least 74 μm and a binder, wherein said binder comprises at least 10 mass % of a fine powder of cordierite having a particle size of less than 74 μm and β-spodumene, and the mass ratio of said β-spodumene to said fine powder of cordierite is from 0.6 to 2.5, and wherein said ceramic filter has a pressure loss coefficient m' of at least $30 \times 10^{-8}$ cm$^2$ as represented by the following formula and as calculated with respect to pores having diameters corresponding to at least 1/10 of the volume-based median pore diameter:

$$m' = (V_p/S_p)^2 \times (\rho)$$

wherein $V_p$ (cm$^3$/g) is a cumulative pore specific volume, $S_p$ (cm$^2$/g) is a cumulative pore specific surface area, and $\rho$ is a cumulative porosity.

6 Claims, No Drawings

CORDIERITE CERAMIC FILTER

The present invention relates to a ceramic filter. More particularly, it relates to a ceramic filter useful for removing dust in a high temperature gas discharged from e.g. a pressure fluidized bed boiler, a coal gasification furnace or a garbage or industrial waste incinerator.

A dust-removing apparatus employing a ceramic tube as a filter is considered to be a key technology for realizing pressure fluidized bed combined power generation or coal gasification power generation as a clean and highly efficient power generation system of next generation wherein coal is used as a fuel, and there has been active competition in its research and development in various countries of the world. Further, its application to an incinerator for garbage or industrial waste is also being studied from the viewpoint of the environmental pollution represented by dioxin, which has been regarded as a serious problem in recent years.

On the other hand, a ceramic tube is susceptible to breakage due to various loads during its use or during its handling before use because of its brittleness attributable to low fracture toughness of ceramics, and accordingly it has been regarded to be very important to secure the reliability in its practical use for an extended period of time. It has been attempted to improve the strength by improving the material for the ceramics tube itself or to develop a technology for inspecting the material before use. However, there are still many problems to be solved.

Most expected for a ceramic tube to be used as a filter, is a material using cordierite as an aggregate, since cordierite not only is excellent in heat resistance but also has a very small thermal expansion coefficient and thus has high durability against thermal stress. For example, U.S. Pat. No. 5,073,178 discloses a ceramic filter for removing a dust from a high temperature dust-containing gas, which comprises a cordierite aggregate as the main component and describes a preferred construction and characteristics such as strength.

As one of the most important characteristics among functions as a filter, the pressure loss being low may be mentioned. In order to increase the efficiency for removing particles in a high temperature gas, it is advisable to reduce the pressure loss by increasing the porosity. On the other hand, from the viewpoint of the reliability for a long period of time, the strength of the filter tube is desired to be as high as possible, and from this viewpoint, the porosity should preferably be small. Namely, in the control of the material by the porosity, the pressure loss and the strength are in a mutually opposing relationship, and it is attempted to improve the strength within an allowable range in consideration with the porosity obtained from the required pressure loss.

However, as the practical application to a high pressure fluidized bed coal power generation is approaching in recent years, the necessity is increasing for a ceramic filter tube which is excellent in reliability and has higher strength. However, it has been difficult to present a ceramic tube having a long term reliability by the structural control of the material solely based on the porosity. Accordingly, it has been required to exactly know the factors which essentially control the pressure loss of a ceramic filter and to present an improved ceramic filter i.e. a ceramic filter which is substantially superior in strength to the conventional ceramic filter and has a low pressure loss.

Accordingly, it is an object of the present invention to provide a cordierite ceramic filter having a low pressure loss and high strength, by clarifying the structural controlling factors.

The present invention provides a ceramic filter comprising at least 50 mass % of a cordierite aggregate having a particle size of at least 74 $\mu$m and a binder, wherein said binder comprises at least 10 mass % of a fine powder of cordierite having a particle size of less than 74 $\mu$m and β-spodumene, and the mass ratio of said β-spodumene to said fine powder of cordierite is from 0.6 to 2.5, and wherein said ceramic filter has a pressure loss coefficient m' of at least $30 \times 10^{-8}$ cm$^2$ as represented by the following formula and as calculated with respect to pores having diameters corresponding to at least 1/10 of the volume-based median pore diameter:

$$m' = (V_p/S_p)^2 \times (\rho)$$

wherein $V_p$ (cm$^3$/g) is a cumulative pore specific volume, $S_p$ (cm$^2$/g) is a cumulative pore specific surface area, and $\rho$ is a cumulative porosity.

Now, the present invention will be described in detail with reference to the preferred embodiments.

The ceramic filter of the present invention essentially comprises a binder which comprises at least 10 mass % of a fine powder of cordierite having a particle size of less than 74 $\mu$m and β-spodumene, and at least 50 mass % of a cordierite aggregate having a particle size of at least 74 $\mu$m. If the cordierite aggregate having a particle size of at least 74 $\mu$m is less than 50 mass %, or if the cordierite aggregate having a particle size of less than 74 $\mu$m is at least 50 mass %, the thermal expansion coefficient of the ceramic filter tends to be high, whereby the properties as a ceramic filter tend to deteriorate such that a property such as thermal shock resistance tends to deteriorate, or the diameters of pores to be formed tend to be small. Further, it is essential that the binder comprises at least 10 mass % of a fine powder of cordierite having a particle size of less than 74 $\mu$m and -spodumene, and the mass ratio of the β-spodumene to the fine powder of cordierite (hereinafter referred to as the β-spodumene ratio) is from 0.6 to 2.5. If the β-spodumene ratio is outside the above range, sintering tends to hardly proceed, and it tends to be difficult to obtain adequate strength as a filter.

However, the object of the present invention to satisfy both the strength and the reduction of pressure loss of a ceramic filter can not be accomplished solely by these requirements, because merely by improving the sintering property of the ceramic filter to secure the strength, only a ceramic filter having a low porosity is obtainable, and the pressure loss will exceed the practically acceptable level, whereby a practically useful ceramic filter can not be obtained. Namely, for the ceramic filter of the present invention, it is essential that the pressure loss coefficient m' (hereinafter referred to as the coefficient) calculated by the following formula is at least $30 \times 10^{-8}$ cm$^2$;

$$m' = (V_p/S_p)^2 \times (\rho)$$

wherein $V_p$ (cm$^3$/g) is a cumulative pore specific volume, $S_p$ (cm$^2$/g) is a cumulative pore specific surface area, and $\rho$ is a cumulative porosity. Namely, by adjusting the coefficient to be at least $30 \times 10^{-8}$ cm$^2$, it is possible to present a ceramic filter which has a low pressure loss within a practically useful level and which satisfies both the practical level of pressure loss and the practical level of strength, even if it may be a ceramic filter having a low porosity as a result of improving the strength.

Here, the cumulative pore specific volume $V_p$ (cm$^3$/g) and the cumulative pore specific surface area $S_p$ (cm$^2$/g) are pore specific volume and a pore specific surface area recalculated by using values of only pores having diameters corresponding to at least 1/10 of the volume-based median pore diameter, based on the results of the measurement of the pore distribution by a mercury porosimeter. A porosity is usually one measured by e.g. an Archimedes method and is not usually a cumulative physical amount. However, the porosity obtained by recalculation by using values of only pores having pore diameters corresponding to at least 1/10 of the volume-based median pore diameter, is taken as a cumulative porosity $\rho$, which is thus distinguished from a usual term "porosity". Specifically, the cumulative porosity $\rho$= (porosity)× (cumulative volume of pores having diameters corresponding to at least 1/10 of the volume-based median pore diameter)/(cumulative volume of all pores).

If the pore specific volume and the pore specific surface area measured by a mercury porosimeter are cumulated with respect to all pores, the coefficient fails to show a good interrelation with the real pressure loss. As a result of investigation of the cause for the failure, it has been found possible to evaluate the properties of the material more accurately by calculating the pressure loss by means of the pore specific volume, the pore specific surface area and the porosity having fine pores (which roughly correspond to 1/10 of the above-mentioned median pore diameter) not related to the pressure loss excluded. In the foregoing, it has been described that a mercury porosimeter is used for the measurement of the pore diameter and the pore specific volume in the present invention. However, any measuring means may be employed so long as it is capable of measuring the pore diameter and the pore specific volume of the ceramic filter of the present invention.

In the ceramic filter of the present invention, the volume-based median pore diameter is from about 25 to 40 $\mu$m. Accordingly, the lower limit of the pore diameter to be taken into consideration for the coefficient is from about 2.5 to 4 $\mu$m i.e. 1/10 of the volume-based median pore diameter. From the inspection of the internal structure of the ceramic filter of the present invention by a scanning electron microscope, small irregularities of not larger than a few $\mu$m are observed on the surface of pores of 10 $\mu$m or larger, and it is considered that at the time of measuring the pore size distribution by a mercury porosimeter, these irregularities have been detected as pores although they are not really pores.

With the ceramic filter of the present invention, it is preferred that the amount of $\beta$-spodumene is from 8 to 20 mass %, based on the mass of the entire filter, since the balance between the strength and the pressure loss of the filter will thereby be good. It is considered that the shape of pores thereby tends to be cylindrical. More preferably, the amount of $\beta$-spodumene is from 10 to 15 mass %.

With the ceramic filter of the present invention, it is preferred that the three-point bending strength at room temperature is at least 8.0 MPa, and the pressure loss when air is ventilated at a rate of 5 cm/s at room temperature (hereinafter referred to as a ventilating pressure loss) is at most 2 kPa, since the balance of the pressure loss and the strength as a ceramic filter will thereby be good, such being preferred for a ceramic filter for e.g. a dust-removing apparatus.

Further, with the ceramic filter of the present invention, it is preferred that the cordierite to be used is one obtained by crystallizing glass, since the uniformity of the material will thereby be high, and the reliability as a ceramic filter will thereby be improved.

Now, the present invention will be described in further detail with reference to Examples. However, it should be understood that the present invention is by no means restricted to such specific Examples.

EXAMPLES

As a cordierite aggregate, a blend having magnesia, alumina and silica sand blended to have a cordierite composition of $2MgO.2Al_2O_3.5SiO_2$, was electrically melted by means of carbon electrodes, and the obtained melt was poured into water and quenched to obtain a glass having the cordierite composition. This glass having the cordierite composition was taken out and then crushed to obtain granular glass. Further, the obtained granular glass was placed on a bogie and passed through a tunnel kiln and thereby heat-treated at about 1,380° C. for 10 hours for crystallization. The crystallized glass was further pulverized and classified to obtain a product within a range of from 20 to 200 mesh (590 to 74 $\mu$m), which was used as an aggregate.

As a binder, a mixture was employed which was prepared by mixing a fine powder (at most 74 $\mu$m) of 200 mesh pass having the same composition as the cordierite aggregate, a fine powder (at most 44 $\mu$m) of 350 mesh pass of $\beta$-spodumene ($Li_2O.Al_2O_3.4SiO_2$) and a fine powder (at most 44 $\mu$m) of 350 mesh pass of clay. Hereinafter, the cordierite having a particle size of at least 74 $\mu$m added as an aggregate, will be referred to as coarse particles of cordierite, and the cordierite having a particle size of less than 74 $\mu$m added as a binder, will be referred to as a fine powder of cordierite, for distinction. Further, as a pore-imparting material, a pitch coke powder having a particle size of from 20 to 100 $\mu$m was employed. This pore-imparting material was added as an additional amount (mass of pitch coke/(mass of aggregate+mass of binder)).

The above-mentioned materials were mixed in various blend ratios, and then an aqueous solution of a phenol resin was added as an organic binder thereto. The mixtures were thoroughly kneaded and dried at 110° C., and then again crushed to obtain granular materials having a grain size of at most 3 mm.

Such a material was filled in a rubber mold and molded into a tubular form having an outer diameter of 170 mm, an inner diameter of 140 mm and a length of 850 mm under a pressure of 98 MPa by means of a hydrostatic molding press. Then, this tubular form was calcined at the maximum temperature of 1,350° C. for 5 hours to obtain a tubular ceramic filter of cordierite.

With respect to this filter, the porosity, the pore distribution characteristic and the ventilation pressure loss were measured by using a small test specimen cut out from the center portion of the tube. The porosity was measured by an Archimedes method. The Archimedes method is designed to obtain the porosity from the dried mass and the mass in water of the test specimen and the theoretical density of the test specimen, and before the measurement of the mass in water, the specimen was held under reduced pressure in water for adequate absorption of water and then subjected to measurement. The pore distribution characteristic was measured by means of a mercury porosimeter (AUTOSCAN-500, manufactured by Yuasa Ionics K.K.). The measuring cell was 3 $cm^3$, and a small test specimen was almost filled in the cell and subjected to the measurement. The pressure for the measurement was from 0 to 3.45 MPa, and the pressure-raising time to 3.45 MPa was about 1 minute. Further, data was treated by taking the contact angle of mercury as 140°. The ventilation pressure loss was measured by the height in water by attaching a test specimen to a test filter pressure loss apparatus and ventilating air at room temperature at a rate of 5 cm/s.

The bending strength was measured by means of an Instron type universal tester (UTM-10T, tradename, manufactured by Orientec K.K.) under conditions of a cross head speed of 0.5 mm/min and a span of 40 mm by using a rectangular test specimen of 11.5 mm×22 mm. For the bending strength test, 96 test specimens were used for one filter tube. The thermal expansion coefficient was measured by means of a thermal expansion meter (TMA8140, tradename, manufactured by Rigaku Denki K.K.) under a condition of a temperature-raising speed of 10° C./min, and an average value of from room temperature to 1,000° C. was taken as the thermal expansion coefficient. Further, to analyze the micro structure of the material, the state of pores was observed by a scanning electron microscope (T-300, manufactured by Nippon Denshi K.K.).

The compositions at the time of preparing ceramic filters in Working Examples of the present invention Examples 2 to 5) and Comparative Examples (Examples 1 and 6 to 8) and the properties of the obtained ceramic filters are shown in Table 1. In Examples 2 to 5, the ventilation pressure loss is at most 1.47 kPa which is lower than 2 kPa which is considered to be the upper limit for practical use in a plant, and thus it is evident that a good ventilation pressure loss is maintained. Further, with respect to the strength, in Examples 2 to 5, the three-point bending strength is higher than 9 MPa which is the strength of the conventional filter tubes. Namely, it has been confirmed that with ceramic filters of the present invention, both the practical pressure loss level and the strength level are satisfied.

On the other hand, when Example 1 is compared with Example 2, it is evident that if the spodumene ratio is less than 0.6, such as 0.3, the volume-based median pore diameter becomes to be 75 $\mu$m, which is too large as the pore diameter of a filter. Especially in the case of a construction where a filter layer having a pore diameter of a few $\mu$m level is maintained on the inner surface of the filter, if the pore diameter of the substrate is too large, penetration of dust into the substrate, takes place, such being undesirable. Further, in Example 6, the amount of coarse particles of cordierite is small, and the ventilation pressure loss exceeds 2 kPa which is considered to be the practical allowable limit. Further, Example 7 shows that even if the amounts of the coarse particles of cordierite, the β-spodumene and the fine powder of cordierite contained in the binder, are within the ranges of the present invention, if the coefficient is less than 30×10$^{-8}$ cm$^2$, the ventilation pressure loss will exceeds 2 kPa which is the practical allowable limit. Further, Example 8 shows that if the amount of β-spodumene exceeds 25 mass %, the sinter strain tends to be large, and it tends to be difficult to obtain a good ceramic molded product. In Table 1, "—" means that no measurement was carried out.

TABLE 1

|  | Example 1 | Example 2 | Example 3 | Example 4 | Example 5 | Example 6 | Example 7 | Example 8 |
|---|---|---|---|---|---|---|---|---|
| Ceramics filter materials |  |  |  |  |  |  |  |  |
| Coarse particles of cordierite (%) | 70 | 70 | 67 | 64 | 58 | 40 | 58 | 45 |
| Fine particle of cordierite (%) | 16 | 12 | 11 | 10 | 10 | 36 | 12 | 10 |
| β-spodumene (%) | 5 | 9 | 11 | 13 | 16 | 12 | 15 | 25 |
| Clay (%) | 9 | 9 | 11 | 13 | 16 | 12 | 15 | 20 |
| β-spodumene ratio | 0.31 | 0.75 | 1.0 | 1.3 | 1.6 | 0.33 | 1.25 | 2.5 |
| Lithium oxide (%) | 0.4 | 0.7 | 0.9 | 1.0 | 1.3 | 1.0 | 1.2 | 2.0 |
| Amount of coke powder (additional amount: %) | 19 | 19 | 19 | 19 | 19 | 9 | Nil | 19 |
| Filter basic properties |  |  |  |  |  |  |  |  |
| Porosity (%) | 39 | 33 | 29 | 26 | 31 | 28 | 22 | 24 |
| Volume-based median pore diameter ($\mu$m) | 75 | 26 | 29 | 33 | 38 | 20 | 23 | 33 |
| Cumulative pore specific volume $V_p$ (cm$^3$/g) | 0.233 | 0.175 | 0.135 | 0.108 | 0.099 | 0.175 | 0.145 | 0.128 |
| Cumulative specific surface area $S_p$ (cm$^2$/g) | 183 | 151 | 115 | 85 | 77 | 241 | 185 | 129 |
| Cumulative porosity ρ | 0.375 | 0.312 | 0.275 | 0.233 | 0.202 | 0.280 | 0.214 | 0.213 |
| Pressure loss coefficient m' × 10$^{-8}$ (cm$^2$) | 60 | 40 | 38 | 38 | 33 | 15 | 13 | 21 |
| Ventilation pressure loss (kPa) | 0.55 | 0.59 | 0.83 | 0.88 | 1.08 | 2.94 | 2.79 | 2.06 |
| Filter mechanical properties |  |  |  |  |  |  |  |  |
| Bending strength (MPa) | 7.8 | 9.3 | 12.3 | 13.9 | 16.2 | 12.2 | 14.2 | 18.1 |
| Thermal expansion coefficient (%) (R.T. - 1,000° C. average) | 0.13 | 0.11 | 0.11 | 0.10 | 0.10 | 0.11 | 0.11 | 0.11 |

The cordierite ceramic filter of the present invention has been found to be excellent in strength and thermal shock resistance and has a small ventilation pressure loss by the control of the micro structure of ceramics, and thus it is particularly suitable for removal of dust in a high temperature gas. By employing a ceramic filter having a low porosity and a low ventilation pressure loss shown by the present invention, it is possible to increase the treating amount of a dust-containing gas even by using a filter apparatus of the same size, and the substantial improvement of the strength substantially contributes to the improvement in the reliability of the filter apparatus.

Especially in recent years, a pressure fluidized bed coal power generation has been proved to be practically useful, and its commercial development is being expected. In such power generation, a dust-removal technique at a high temperature is regarded as the most important technique, and its completion is decisive for successful commercialization. Under these circumstances, the ceramic filter of the present invention having a low pressure loss and high strength is believed to contribute to the substantial progress in the commercialization of the above-mentioned dust-removal technique. At the same time, by cleaning the high temperature dust-containing gas which used to be hardly recoverable, it will be possible to recover the energy, and thus the industrial usefulness of the present invention is substantial also from the viewpoint of the conservation of energy and resources.

What is claimed is:

1. A ceramic filter comprising
    at least 50 mass % of a cordierite aggregate having a particle size of at least 74 μm; and
    a binder comprising at least 10 mass % of a fine powder of cordierite having a particle size of less than 74 μm and β-spodumene,
    wherein the mass ratio of said β-spodumene to said fine powder of cordierite is from 0.6 to 2.5,
    and wherein said ceramic filter has a pressure loss coefficient m' of at least $30 \times 10^{-8}$ cm² as represented by the following formula and as calculated with respect to pores having diameters corresponding to at least 1/10 of the volume-based median pore diameter:

$$m' = (V_p/S_p)^2 \times (\rho)$$

wherein $V_p$ (cm³/g) is a cumulative pore specific volume, $S_p$ (cm²/g) is a cumulative pore specific surface area, and p is a cumulative porosity.

2. The ceramic filter according to claim 1, wherein said β-spodumene is from 8 to 20 mass %.

3. The ceramic filter according to claim 1, wherein said β-spodumene is from 10 to 15 mass %.

4. The ceramic filter according to claim 1, which has a three-point bending strength at room temperature of at least 8.0 MPa and a ventilating pressure loss of at most 2 kPa.

5. The ceramic filter according to claim 1, which has a cylindrical shape.

6. The ceramic filter according to claim 1, wherein said cordierite is obtained by crystallizing glass.

* * * * *